United States Patent
Ichikawa et al.

(10) Patent No.: US 6,806,323 B2
(45) Date of Patent: Oct. 19, 2004

(54) GOLF BALL

(75) Inventors: Yasushi Ichikawa, Saitama (JP); Rinya Takesue, Saitama (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/139,392

(22) Filed: May 7, 2002

(65) Prior Publication Data

US 2003/0064834 A1 Apr. 3, 2003

(30) Foreign Application Priority Data

May 17, 2001 (JP) ........................................ 2001-148036

(51) Int. Cl.$^7$ .......................... A63B 37/12; C08L 75/08
(52) U.S. Cl. ........................ 525/440; 525/457; 528/76; 473/378
(58) Field of Search .................. 525/440, 457; 528/76; 473/378

(56) References Cited

U.S. PATENT DOCUMENTS

| | | | | |
|---|---|---|---|---|
| 4,347,338 A | * | 8/1982 | Torii et al. ................ | 525/123 |
| 6,123,628 A | * | 9/2000 | Ichikawa et al. .......... | 473/374 |
| 6,142,888 A | * | 11/2000 | Higuchi et al. ............ | 473/374 |
| 6,355,715 B1 | * | 3/2002 | Ladd et al. ................. | 524/432 |
| 2002/0098918 A1 | * | 7/2002 | Wu et al. ................... | 473/377 |
| 2003/0073516 A1 | * | 4/2003 | Watanabe et al. .......... | 473/378 |

FOREIGN PATENT DOCUMENTS

| JP | 09271538 A | 10/1997 |
|---|---|---|
| JP | 11178949 A | 7/1999 |

* cited by examiner

Primary Examiner—David J. Buttner
(74) Attorney, Agent, or Firm—Sughrue Mion, PLLC

(57) ABSTRACT

Disclosed is a golf ball having a cover formed from a thermoplastic polyurethane material which can be recycled for molding, which exhibits high restitution, and which exhibits excellent scuff resistance. The cover is formed from a composition (C) containing, as predominant components, the following components (A) and (B):

(A) a thermoplastic polyurethane material having a restitution elastic modulus of at least 40% and containing, as a polymeric polyol, a polyether polyol having an average molecular weight of at least 1,500, and (B) an isocyanate mixture in which an isocyanate compound (b-1) having at least two isocyanate groups serving as functional groups in the molecule is dispersed in a thermoplastic resin (b-2) which is substantially non-reactive with the isocyanate groups.

9 Claims, No Drawings

GOLF BALL

BACKGROUND OF THE INVENTION

1. Field of the Invention

The present invention relates to a golf ball having a cover formed from a thermoplastic polyurethane material; and more particularly to a golf ball having a cover formed from a thermoplastic polyurethane material which can be recycled for molding, which exhibits high restitution, and which exhibits excellent scuff resistance.

2. Description of the Related Art

In recent years, polyurethane materials have become of interest as materials for forming a golf ball cover. Polyurethane materials are classified into thermosetting polyurethane materials and thermoplastic polyurethane materials, and a process for forming a thermosetting polyurethane material into a product differs from a process for forming a thermoplastic polyurethane material into a product. A thermosetting polyurethane material can be formed into a product through the following procedure: a urethane prepolymer having an isocyanate end group and a curing agent such as polyol or polyamine, which serve as liquid raw materials, are mixed under heating; and the resultant mixture is fed directly to a mold and then heated, to thereby allow urethane curing reaction to proceed.

Many studies have heretofore focused on golf balls formed from thermosetting polyurethane materials. For example, U.S. Pat. Nos. 5,334,673, 6,117,024, and 6,190,268 disclose such golf balls. Meanwhile, U.S. Pat. Nos. 5,006,297, 5,733,428, 5,888,437, 5,897,884, and 5,947,843 disclose forming methods of thermosetting polyurethane materials.

Since a thermosetting polyurethane material exhibits no thermoplasticity, the material and a product formed from the material cannot be recycled. In addition, when a thermosetting polyurethane material is employed for forming a specific product such as a golf ball cover (i.e., a product which covers a core), efficient production of the product is not attained, since the heating-curing step and the cooling step of the material requires long time, and high reactivity and instability of the material make control of the molding time very difficult.

In the case where a thermoplastic polyurethane material is formed into a molded product, the product is not directly obtained through reaction of raw materials, but is formed from a linear polyurethane material an intermediate—which has been synthesized by employment of raw materials and a synthesis method, the raw materials and the method differing from those employed in the case of the aforementioned thermosetting polyurethane material. Such a linear polyurethane material exhibits thermoplasticity, and is cured through cooling. Therefore, such a polyurethane material can be molded by use of an injection molding machine. Injection molding of a thermoplastic polyurethane material is a technique suitable for forming a golf ball cover, since the molding time of a thermoplastic polyurethane material is much shorter than that of a thermosetting polyurethane material, and a thermoplastic polyurethane material is suitable for precise molding. Meanwhile, a thermoplastic polyurethane material can be recycled, and is thus environmentally friendly. U.S. Pat. Nos. 3,395,109, 4,248,432, and 4,442,282 disclose golf balls formed from thermoplastic polyurethane materials.

However, when a golf ball cover is formed from a conventional thermoplastic polyurethane material, the resultant golf ball is not satisfactory in terms of feeling on impact, controllability, restitution, and scuff resistance upon being hit with an iron.

In order to solve such a problem, Japanese Patent Application Laid-Open (kokai) No. 9-271538 discloses a golf ball cover formed from a thermoplastic polyurethane material exhibiting high restitution. However, the disclosed golf ball cover is not satisfactory in terms of scuff resistance upon being hit with an iron.

Japanese Patent Application Laid-Open (kokai) No. 11-178949 discloses a golf ball cover exhibiting relatively excellent scuff resistance upon being hit with an iron, which predominantly contains a reaction product formed from a thermoplastic polyurethane material and an isocyanate compound. When the cover is formed, an isocyanate compound such as a diisocyanate or a block isocyanate dimer, serving as an additive, is added to a thermoplastic polyurethane material in the course of heating, melting, and mixing by use of an extruder, or in the course of injection molding, to thereby allow reaction to proceed.

However, in the case of molding of the cover disclosed in Japanese Patent Application Laid-Open (kokai) No. 11-178949, since an isocyanate compound must be handled with great care due to its inactivation by moisture, obtaining a stable reaction product is difficult. Meanwhile, a block isocyanate exhibiting moisture resistance is not suitable for forming the cover, since a blocking agent issues a strong odor when the isocyanate is thermally dissociated. When an isocyanate compound assumes the form of powder or solution, control of the amount of the compound which is added to a thermoplastic polyurethane material is difficult, and therefore cover properties cannot be controlled adequately. In addition, since the thermoplastic polyurethane material differs in melting point and melt viscosity from the isocyanate compound, thorough and satisfactory kneading thereof may fail to be attained in a molding apparatus. Therefore, in the technique disclosed in the above publication, the effect of moisture on a cover material and the amount of an additive is not satisfactorily controlled, resulting in failure to produce a golf ball cover which is satisfactory in terms of improvement of scuff resistance.

Japanese Patent Application Laid-Open (kokai) No. 11-178949 discloses an aliphatic isocyanate-based thermoplastic polyurethane material to be used as a desirable thermoplastic polyurethane material. However, since the thermoplastic polyurethane material is highly reactive with isocyanate and its reaction is difficult to control, the polyurethane material involves the following problems: gelation easily occurs before injection molding, and sufficient plasticity cannot be maintained; gelation may occur during molding of a cover; and the polyurethane material cannot be recycled, due to gelation. Because of such problems, the thermoplastic polyurethane material is difficult to use in practice.

Japanese Patent Publication (kokoku) No. 58-2063 (U.S. Pat. No. 4,347,338) discloses a process for producing a thermosetting polyurethane product, in which a compound having two or more isocyanate groups is mixed with a thermoplastic resin which is non-reactive with an isocyanate group, the resultant mixture is incorporated into a thermoplastic polyurethane material, and the resultant material is subjected to molding by use of a molding machine. However, the purpose of the technique disclosed in the above publication is to improve the polyurethane product only in terms of solvent resistance and durability against continuous, repeating friction, and the publication does not disclose use of the aforementioned forming material as a material of a golf ball cover. There still exists demand for a golf ball cover material which can provide a golf ball with various necessary properties, such as restitution, total distance, spin performance, controllability, feeling on impact, scuff resistance, cut resistance, and discoloration resistance.

SUMMARY OF THE INVENTION

In view of the foregoing, an object of the present invention is to provide a golf ball having a cover formed from a thermoplastic polyurethane material which can be recycled for molding, which exhibits high restitution, and which exhibits excellent scuff resistance.

In order to achieve the above object, the present invention provides the following golf balls.

(1) A golf ball comprising a core and a cover therefor, wherein the cover is formed from a cover material comprising, as a predominant component, a thermoplastic polyurethane material (A) having a restitution elastic modulus of at least 40% and containing, as a polymeric polyol, a polyether polyol having an average molecular weight of at least 1,500.

(2) A golf ball comprising a core and a cover therefor, wherein the cover is formed from a composition (C) containing, as predominant components, the following components (A) and (B):

(A) a thermoplastic polyurethane material having a restitution elastic modulus of at least 40% and containing, as a polymeric polyol, a polyether polyol having an average molecular weight of at least 1,500, and (B) an isocyanate mixture in which an isocyanate compound (b-1) having at least two isocyanate groups serving as functional groups in the molecule is dispersed in a thermoplastic resin (b-2) which is substantially non-reactive with the isocyanate groups.

(3) A golf ball according to (2), wherein the isocyanate compound (b-1) in the isocyanate mixture (B) is 4,4'-diphenylmethane diisocyanate.

(4) A golf ball according to (2) or (3), wherein the thermoplastic resin (b-2) in the isocyanate mixture (B) is a thermoplastic polyester resin.

(5) A golf ball according to any one of (2) through (4) wherein, in the isocyanate mixture (B), the ratio by weight of the thermoplastic resin (b-2) to the isocyanate compound (b-1) is 100:5 to 100:100.

(6) A golf ball according to any one of (2) through (5), wherein, in the composition (C), the ratio by weight of the thermoplastic polyurethane material (A) to the isocyanate mixture (B) is 100:1 to 100:40.

(7) A golf ball according to any one of (1) through (6), wherein the thermoplastic polyurethane material (A) is synthesized from a polyether polyol and an aromatic diisocyanate.

(8) A golf ball according to (7), wherein the aromatic diisocyanate is 4,4'-diphenylmethane diisocyanate.

(9) A golf ball according to any one of (1) through (8), wherein the polyether polyol of the thermoplastic polyurethane material (A) is a polytetramethylene glycol having an average molecular weight of at least 2,000.

(10) A golf ball according to any one of (1) through (9), wherein the material of the cover has a surface hardness of 40 to 80 as measured by use of a D-type durometer, and a restitution elastic modulus of at least 45%.

(11) A golf ball according to any one of (1) through (10), wherein the material of the cover can be recycled for molding.

DESCRIPTION OF THE INVENTION AND PREFERRED EMBODIMENTS

The present invention will next be described in more detail. Firstly, components (A) and (B) and composition (C) will be described.

(A) Thermoplastic Polyurethane Material

The thermoplastic polyurethane material includes soft segments formed of a polymeric polyol (polymeric glycol), a chain extender constituting hard segments, and a diisocyanate. No particular limitation is imposed on the polymeric polyol serving as a raw material, and the polymeric polyol may be any one selected from polymeric polyols which are conventionally employed in the technical field related to thermoplastic polyurethane materials. Examples of the polymeric polyol include polyester polyols and polyether polyols. Of these, polyether polyols are more preferred to polyester polyols, since a thermoplastic polyurethane material having high restitution elastic modulus and exhibiting excellent low-temperature properties can be synthesized.

In such a case, the present invention employs a thermoplastic polyurethane material (A) containing, as a polymeric polyol, a polyether polyol having an average molecular weight of at least 1,500. Examples of the polyether polyol include polytetramethylene glycol and polypropylene glycol. From the viewpoints of restitution elastic modulus and low-temperature properties, polytetramethylene glycol is particularly preferred. The average molecular weight of the polymeric polyol is preferably 1,500 to 5,000. The average molecular weight is more preferably 2,000 to 4,000, in order to synthesize a thermoplastic polyurethane material having high restitution elastic modulus.

Any chain extender which is conventionally employed in the technical field related to thermoplastic polyurethane materials is preferably used.

Examples of the chain extender include, but are not limited to, 1,4-butylene glycol, 1,2-ethylene glycol, 1,3-butanediol, 1,6-hexanediol, and 2,2-dimethyl-1,3-propanediol. The average molecular weight of the chain extender is preferably 20 to 15,000.

Any diisocyanate which is conventionally employed in the technical field related to thermoplastic polyurethane materials is preferably used. Examples of the diisocyanate include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Some diisocyanates involve difficulty in controlling cross-linking reaction during injection molding. In the present invention, 4,4'-diphenylmethane diisocyanate, which is an aromatic diisocyanate, is most preferred, in consideration of stability in reaction with the below-described isocyanate mixture (B).

In the present invention, a thermoplastic polyurethane material synthesized from a polyether polyol and an aromatic diisocyanate is most preferred; the polyether polyol is polytetramethylene glycol having an average molecular weight of at least 2,000, and the aromatic diisocyanate is 4,4'-diphenylmethane diisocyanate.

According to the present invention, the restitution elastic modulus of the thermoplastic polyurethane resin (A) formed from the aforementioned materials is preferably at least 40%, particularly preferably at least 43%, as measured in accordance with JIS-K7311. When the restitution elastic modulus of the resin is lower than 40%, the resultant cover material exhibits low restitution, and thus the total distance of the resultant golf ball is decreased.

Preferred examples of the thermoplastic polyurethane material containing the aforementioned materials include commercially available polyurethane materials, such as Pandex T-8290, T-8295, and T-8260 (products of DIC Bayer Polymer Ltd.), and Resamine 2593 and 2597 (products of Dainichiseika Color & Chemicals Mfg. Co., Ltd.).

(B) Isocyanate Mixture

The isocyanate mixture (B) is obtained by dispersing the isocyanate compound (b-1) having at least two isocyanate groups serving as functional groups in the molecule in the thermoplastic resin (b-2) which is substantially non-reactive with the isocyanate groups. The aforementioned isocyanate compound (b-1) is preferably an isocyanate compound which is conventionally employed in the technical field related to thermoplastic polyurethane materials. Examples of the isocyanate compound include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Of these, 4,4'-diphenylmethane diisocyanate is most preferred, in consideration of reactivity and operational safety.

The aforementioned thermoplastic resin (b-2) is preferably a resin having low water-absorbability and high compatibility with the thermoplastic polyurethane material. Examples of the resin include polystyrene resins, polyvinyl chloride resins, ABS resins, polycarbonate resins, and polyester elastomers (e.g., polyether-ester block copolymers and polyester-ester block copolymers). Of these, in consideration of restitution elasticity and strength, polyester elastomers, inter alia, polyether-ester block copolymers, are particularly preferred.

In the isocyanate mixture (B), the ratio by weight of the thermoplastic resin (b-2) to the isocyanate compound (b-1) is preferably 100:5 to 100:100, more preferably 100:10 to 100:40. When the ratio of the isocyanate compound (b-1) to the thermoplastic resin (b-2) is excessively low, a large amount of the isocyanate mixture (B) must be added to the thermoplastic polyurethane material (A), in order to achieve a successful cross-linking reaction between the isocyanate compound (b-1) and the thermoplastic polyurethane material (A). As a result, the thermoplastic resin (b-2) greatly affects the thermoplastic polyurethane material (A), resulting in unsatisfactory properties of the composition (C). In contrast, when the ratio of the isocyanate compound (b-1) to the thermoplastic resin (b-2) is excessively high, thorough and satisfactory kneading of the isocyanate compound (b-1) into the thermoplastic resin (b-2) is not attained, and thus preparation of the isocyanate mixture (B) becomes difficult.

The isocyanate mixture (B) can be obtained through, for example, the following procedure: the isocyanate compound (b-1) is incorporated into the thermoplastic resin (b-2), and the resultant mixture is completely kneaded by use of a mixing roll or a banbury mixer at 130 to 250° C., followed by pelletization or pulverization after cooling. Preferred examples of the isocyanate mixture (B) include commercially available isocyanate mixtures such as Crossnate EM30 (product of Dainichiseika Color & Chemicals Mfg. Co., Ltd.).

(C) Composition

The composition (C) comprises, as predominant components, a thermoplastic polyurethane material (A) and an isocyanate mixture (B). In the composition (C), the ratio by weight of the thermoplastic polyurethane material (A) to the isocyanate mixture (B) is preferably 100:1 to 100:100, more preferably 100:5 to 100:50, much more preferably 100:10 to 100:30. When the ratio of the isocyanate mixture (B) to the thermoplastic polyurethane material (A) is excessively low, the isocyanate mixture (B) exerts insufficient cross-linking effect, whereas when the ratio is excessively high, unreacted isocyanate imparts a color to the resultant composition.

In the present invention, the cover-forming material may contain other components in addition to the aforementioned components. Examples of such "other components" include thermoplastic polymer materials other than the thermoplastic polyurethane material, such as polyester elastomer, polyamide elastomer, ionomer resin, styrene block elastomer, polyethylene, and nylon resin. In this case, the incorporation amount of thermoplastic polymer materials other than the thermoplastic polyurethane material is 0 to 100 parts by weight, preferably 10 to 75 parts by weight, more preferably 10 to 50 parts by weight, on the basis of 100 parts by weight of the thermoplastic polyurethane material which serves as an essential component. The incorporation amount is appropriately determined in accordance with various purposes, including regulation of the hardness of the cover-forming material and improvement of the restitution, fluidity, and adhesion of the cover-forming material. If desired, the cover-forming material may further contain various additives, such as pigments, dispersants, antioxidants, light-resistant stabilizers, UV absorbers, and release agents.

A cover of the golf ball of the present invention can be formed through, for example, the following procedure: the isocyanate mixture (B) is added to the thermoplastic polyurethane material (A) and then dry-mixed, and a cover is formed from the resultant mixture around a core by use of an injection molding apparatus. The molding temperature varies with the type of the thermoplastic polyurethane material (A), but is typically 150 to 250° C.

In the resultant golf ball cover, reaction or cross-linking is thought to proceed as follows: an isocyanate group is reacted with a residual OH group of the thermoplastic polyurethane material, to thereby form a urethane bond; or an isocyanate group is added to a urethane group of the thermoplastic polyurethane material, to thereby form an allophanate or biuret cross-linking structure. In this case, although cross-linking proceeds insufficiently immediately after injection molding of the cover-forming material, cross-linking proceeds through annealing after injection molding, and the resultant golf ball cover is endowed with useful properties. As used herein, the term "annealing" refers to aging through heating at a certain temperature for a predetermined period of time, or aging at room temperature for a predetermined period of time.

The surface hardness of the cover material of the golf ball of the present invention is preferably 40 to 80, more preferably 43 to 60, much more preferably 45 to 55, as measured by use of a D-type durometer in accordance with JIS-K6253. When the surface hardness of the cover-forming material is excessively low, the resultant golf ball tends to produce excessive back-spin upon being hit with an iron; i.e., controllability of the golf ball is impaired. In contrast, when the surface hardness of the cover-forming material is excessively high, the resultant golf ball tends to produce insufficient back-spin upon being hit with an iron; i.e., controllability of the golf ball is lowered, and feeling on impact is impaired.

The restitution elastic modulus of the cover material of the golf ball of the present invention is preferably at least 45%, more preferably 45 to 85%, further preferably 50 to 80%, much more preferably 50 to 60%, as specified by JIS-K7311. Since the thermoplastic polyurethane material does not exhibit high restitution, preferably, the restitution elastic modulus is strictly selected. When the restitution elastic modulus of the cover-forming material is excessively low, the total distance of the golf ball is considerably lowered. In contrast, when the restitution elastic modulus of the cover-forming material is excessively high, the initial velocity of the golf ball becomes excessively high when being shot or putted (i.e., when controllability of the golf is required within the range of a total distance of 100 yards or less), and the golf ball may fail to meet a golfer's demand.

No particular limitation is imposed on the core employed in the golf ball of the present invention, and any type of cores that are usually employed can be employed. Examples of the core which may be employed include a solid core for a two-piece ball, a solid core having a plurality of vulcanized rubber layers, a solid core having a plurality of resin layers, and a thread-wound core having a thread rubber layer. No particular limitation is imposed on the outer diameter, weight, hardness, and material of the core. The thickness of the golf ball cover of the present invention preferably falls within a range of 0.1 to 5.0 mm. The cover may have a multi-layer structure, so long as the overall thickness of the cover falls within the above range.

The golf ball of the present invention is formed so as to have a diameter and a weight as specified under the Rules of Golf approved by R&A. Typically, the diameter is at least 42.67 mm, and the weight is 45.93 g or less. The diameter is preferably 42.67 to 42.9 mm. The deformation amount of the golf ball under application of a load of 980 N (100 kg) is preferably 2.0 to 4.0 mm, more preferably 2.2 to 3.8 mm.

EXAMPLES

The present invention will next be described in detail by way of Examples, which should not be construed as limiting the invention thereto.

Examples and Comparative Examples

| Core composition | |
| --- | --- |
| Polybutadiene rubber | 100 parts by weight |
| Zinc acrylate | 21.5 parts by weight |
| Zinc oxide | 12 parts by weight |
| Dicumyl peroxide | 1 part by weight |

The components of the aforementioned core composition were kneaded, and then subjected to vulcanization and forming at 155° C. for 20 minutes, to thereby obtain a solid core for a two-piece solid golf ball (diameter: 38.5 mm). BR01 (product of Japan Synthetic Rubber Co., Ltd.) was employed as the polybutadiene rubber. The specific gravity of the thus-obtained core was 1.07; the deformation amount under application of a load of 980 N (100 kg) was 3.4 mm; and the initial velocity as measured by means of a method specified by USGA (R&A) was 78.1 m/s.

Cover materials shown in Tables 1 and 2 (unit: part(s) by weight) were kneaded by use of a twin-screw extruder at 190° C., to thereby obtain cover-forming materials. Components shown in Tables 1 and 2 are described below.

Polyurethane 1 (Thermoplastic Polyurethane Material)

Pandex T8290: MDI-PTMG-type thermoplastic polyurethane material (product of DIC Bayer Polymer Ltd.) (JIS A surface hardness: 93, restitution elastic modulus: 52%)

Polyurethane 2 (Thermoplastic Polyurethane Material)

Pandex T8295: MDI-PTMG-type thermoplastic polyurethane material (product of DIC Bayer Polymer Ltd.) (JIS A surface hardness: 97, restitution elastic modulus: 44%)

Polyurethane 3 (Thermoplastic Polyurethane Material)

Pandex T8260: MDI-PTMG-type thermoplastic polyurethane material (product of DIC Bayer Polymer Ltd.) (Surface hardness as measured by use of a D-type durometer: 56, restitution elastic modulus: 45%)

Polyurethane 4 (Thermoplastic Polyurethane Material)

Pandex T7298: Non-yellowing-type thermoplastic polyurethane material containing aliphatic isocyanate (product of DIC Bayer Polymer Ltd.) (JIS A surface hardness: 98, restitution elastic modulus: 54%)

Isocyanate 1 (Isocyanate Mixture)

Crossnate EM30: Isocyanate master batch (product of Dainichiseika Color & Chemicals Mfg. Co., Ltd.) containing 30% 4,4'-diphenylmethane diisocyanate (isocyanate concentration as measured through amine back titration according to JIS-K1556: 5–10%, master batch base resin: polyester elastomer)

Isocyanate 2 (Isocyanate Compound)

Desmodur TT: Tolylene diisocyanate (TDI) dimer (product of Sumitomo Bayer Co., Ltd.) (effective NCO content: 24 to 24.6 weight %, isocyanate: TDI)

Subsequently, each of the aforementioned solid cores was placed in a mold for injection molding, and a cover (thickness: 2.1 mm) was formed from each of the cover materials—obtained by dry-mixing the components (A) and (B))—around the core by means of injection molding, to thereby produce a two-piece solid golf ball (Examples and Comparative Examples). The resultant golf ball was allowed to stand at room temperature for one week, and then properties of the golf ball were evaluated. The evaluation methods are described below. A sheet (thickness: 2 mm) formed through injection molding was allowed to stand at room temperature for one week, and then subjected to measurement of cover properties. Furthermore, recyclability (i.e., formability) of the cover material was evaluated. The results are shown in Tables 1 and 2.

(Cover Properties)

Surface Hardness

The surface hardness of the cover was measured by use of a D-type durometer in accordance with JIS-K6253.

Restitution Elastic Modulus

The restitution elastic modulus of the cover was measured in accordance with JIS-K7311.

(Ball Properties)

Hardness

The deformation amount of the golf ball under application of a load of 980 N (100 kg) was measured.

Initial Velocity

The initial velocity of the golf ball was measured by means of a method specified by USGA (R&A).

Total Distance

The golf ball was hit at a head speed of 45 m/s by use of No. 1 wood (a driver) mounted on a swing robot machine, to thereby measure a total distance.

Scuff Resistance Upon Being Hit with an Iron

The golf ball was maintained at 23° C., 13° C., or 0° C., and then hit at a head speed of 33 m/s by use of a pitching wedge mounted on a swing robot machine. Thereafter, the scuff resistance of the resultant golf ball was visually evaluated on the basis of the following criteria.

5: No scuffing or substantially no scuffing is observed.

4: Scuffing is observed, but is negligible.

3: The surface of the ball is slightly scaly.

2: The surface of the ball is scaly, and a portion between dimples of the cover is lost to some extent.

1: A portion between dimples of the cover is completely exfoliated.

(Formability)

Recyclability of Cover Material

A runner resin generated during injection molding was pulverized and recycled, and recyclability of the cover material was evaluated on the basis of the following criteria. The term "runner resin" refers to a resin formed in a runner provided for uniformly feeding a molten resin to an injection molding machine. Typically, when a thermoplastic resin product is formed, a runner resin is pulverized and recycled by mixing with a virgin resin.

Possible: When a pulverized runner resin (up to 50%) was mixed with a virgin resin, and the resultant mixture was formed into a product (i.e., a golf ball cover), problems such as offset of a core did not arise.

Impossible: Since gelation of a runner resin occurred, and the runner resin was not melted under application of heat, the resin could not be recycled.

TABLE 1

|  |  | Cover material | Ex. 1 | Ex. 2 | Ex. 3 | Ex. 4 | Ex. 5 |
|---|---|---|---|---|---|---|---|
| (C) | (A) | Polyurethane 1 | 50 | | | | |
|  |  | Polyurethane 2 | 50 | 100 | 100 | 100 | |
|  |  | Polyurethane 3 | | | | | 100 |
|  |  | Titanium oxide | 3 | 3 | 3 | 3 | 3 |
|  |  | Polyethylene wax | 1 | 1 | 1 | 1 | 1 |
|  | (B) | Isocyanate 1 | 20 | 5 | 10 | 20 | 20 |
| Cover | | Surface hardness | 47 | 47 | 49 | 53 | 58 |
| properties | | Restitution elastic modulus (%) | 50 | 45 | 46 | 48 | 48 |
| Ball | | Outer diameter (mm) | 42.7 | 42.7 | 42.7 | 42.7 | 42.7 |
| properties | | Weight (g) | 45.2 | 45.1 | 45.2 | 45.3 | 45.3 |
|  | | Hardness (mm) | 3.3 | 3.2 | 3.1 | 2.8 | 2.6 |
|  | | Initial velocity(m/s) | 77.1 | 76.9 | 77 | 77.2 | 77.3 |
|  | | Total distance(m) | 226 | 226 | 227 | 227 | 228 |
|  | | Scuff resistance at 23° C. | 5 | 5 | 5 | 5 | 5 |
|  | | at 13° C. | 5 | 5 | 5 | 5 | 5 |
|  | | at 0° C. | 4 | 3 | 4 | 4 | 4 |
| Formability | | Recyclability | Possible | Possible | Possible | Possible | Possible |

TABLE 2

|  |  | Cover material | Comp. Ex. 1 | Comp. Ex. 2 | Comp. Ex. 3 | Comp. Ex. 4 |
|---|---|---|---|---|---|---|
| (C) | (A) | Polyurethane 2 | | | 100 | |
|  |  | T8160 | 100 | | | |
|  |  | Polyurethane 3 | | 100 | | |
|  |  | Polyurethane 4 | | | | 100 |
|  |  | Titanium oxide | 3 | 3 | 3 | 3 |
|  |  | Polyethlene wax | 1 | 1 | 1 | 1 |
|  | (B) | Isocyanate 1 | 20 | | | |
|  |  | Isocyanate 2 | | | | 1.5 |
| Cover | | Surface hardness | 58 | 55 | 47 | 51 |
| properties | | Restitution elastic modulus (%) | 38 | 45 | 45 | 48 |
| Ball | | Outer diameter(mm) | 42.7 | 42.7 | 42.7 | 42.7 |
| properties | | Weight (g) | 45.3 | 45.3 | 45.1 | 45.2 |
|  | | Hardness (mm) | 2.8 | 2.8 | 3.2 | 3 |
|  | | Initial velocity (m/s) | 76 | 76.7 | 76.7 | 77 |
|  | | Total distance (m) | 216 | 224 | 224 | 226 |
|  | | Scuff resistance at 23° C. | 5 | 2 | 3 | 4 |
|  | | at 13° C. | 5 | 2 | 2 | 3 |
|  | | at 0° C. | 4 | 1 | 1 | 2 |
| Formability | | Recyclability | Possible | Possible | Possible | Impossible |

As is clear from Tables 1 and 2, the golf balls of the Examples exhibit high restitution and excellent flight performance. The results show that the golf balls of the Examples exhibit excellent scuff resistance upon being hit with an iron. In contrast, each of the golf balls of the Comparative Examples—in which the cover was not produced from the cover material of the present invention—exhibits poor restitution, and is not satisfactory in terms of scuff resistance upon being hit with an iron. The golf ball of Comparative Example 4 exhibits relatively good ball properties. However, since the reactivity of the cover material after forming is excessively high, and gelation of the material occurs; i.e., the material is no longer melted under application of heat, a runner resin generated during forming cannot be recycled.

As described above, according to the present invention, there can be produced a golf ball having a cover which can be recycled for molding and exhibits high restitution and excellent scuff resistance.

What is claimed is:

1. A golf ball comprising a core and a cover therefor, wherein the cover is formed from a composition (C) containing, as predominant components, the following components (A) and (B):

(A) a thermoplastic polyurethane material having a restitution elastic modulus of at least 40% and containing, as a polymeric polyol, a polyether polyol having an average molecular weight of at least 1,500, and (B) an isocyanate mixture in which an isocyanate compound (b-1) having at least two isocyanate groups serving as functional groups in the molecule is dispersed in a thermoplastic polyetherester resin (b-2) which is substantially non-reactive with the isocyanate groups.

2. A golf according to claim 1, wherein the isocyanate compound (b-1) in the isocyanate mixture (B) is 4,4'-diphenylmethane diisocyanate.

3. A golf ball according to claim 1, wherein in the isocyanate mixture (B), the ratio by weight of the thermoplastic resin (b-2) to the isocyanate compound (b-1) is 100:5 to 100:100.

4. A golf according to claim 1, wherein, in the composition (C), the ratio by weight of the thermoplastic polyurethane material (A) to the isocyanate mixture (B) is 100:1 to 100:40.

5. A golf ball according to claim 1, wherein the thermoplastic polyurethane material (A) is synthesized from a polyether polyol and an aromatic diisocyanate.

6. A golf ball according to claim 5, wherein the aromatic diisocyanate is 4,4'-diphenylmethane diisocyanate.

7. A golf ball according to claim 1, wherein the polyether polyol of the thermoplastic polyurethane material (A) is a polytetramethylene glycol having an average molecular weight of at least 2,000.

8. A golf ball according to claim 1, wherein the material of the cover has a surface hardness of 40 to 80 as measured by use of a D-type durometer, and a restitution elastic modulus of at least 45%.

9. A golf ball according to claim 1, wherein the material of the cover can be recycled for recycling.

* * * * *